US008424733B2

(12) United States Patent
Polewarczyk et al.

(10) Patent No.: US 8,424,733 B2
(45) Date of Patent: Apr. 23, 2013

(54) ROOF RACK BOWS WITH MECHANISM FOR AUTOMATIC EXTENSION AND RETRACTION

(75) Inventors: Joseph M. Polewarczyk, Rochester Hills, MI (US); Kevin G. Kolpasky, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 12/753,156

(22) Filed: Apr. 2, 2010

(65) Prior Publication Data

US 2011/0240696 A1   Oct. 6, 2011

(51) Int. Cl.
*B60R 9/045*   (2006.01)

(52) U.S. Cl.
USPC .......................................................... 224/321

(58) Field of Classification Search ................... 224/321
See application file for complete search history.

(56) References Cited

U.S. PATENT DOCUMENTS

| 7,066,364 | B2 * | 6/2006 | Kmita et al. ................... 224/321 |
| 7,090,103 | B2 * | 8/2006 | Aftanas et al. ................ 224/321 |
| 7,766,200 | B2 * | 8/2010 | Park et al. ..................... 224/315 |
| 8,056,782 | B2 * | 11/2011 | Lim et al. ...................... 224/321 |
| 2006/0163297 | A1 | 7/2006 | Moreau |
| 2009/0242599 | A1 | 10/2009 | Stahl et al. |

FOREIGN PATENT DOCUMENTS

| DE | 102007047755 A1 * | 4/2009 |
| EP | 1470960 A1 * | 10/2004 |
| EP | 1533186 A2 * | 5/2005 |

* cited by examiner

*Primary Examiner* — Justin Larson
(74) *Attorney, Agent, or Firm* — Quinn Law Group, PLLC

(57) ABSTRACT

A roof rack assembly includes first and second roof rails spaced from one another, each roof rail having a respective deployable roof rack bow and a respective drive mechanism operatively connected to the roof rack bow that causes the roof rack bow to extend in length by a predetermined amount when pivoted from a stowed position to a deployed position and retract in length by the predetermined amount when pivoted from the deployed position to the retracted position. The predetermined amount that the bows extend when pivoted is sufficient to cause the respective roof rack bows to span from the first roof rail to the second roof rail when in the deployed position.

20 Claims, 5 Drawing Sheets

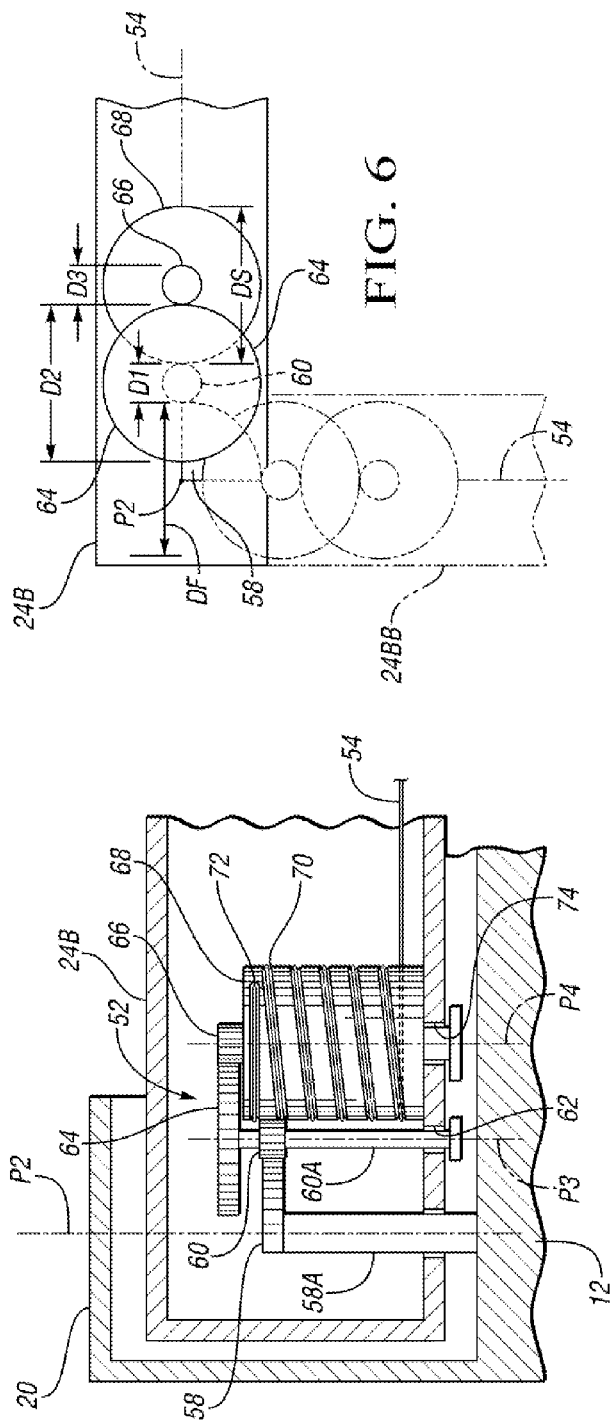

\# ROOF RACK BOWS WITH MECHANISM FOR AUTOMATIC EXTENSION AND RETRACTION

TECHNICAL FIELD

The invention relates to a vehicle roof rack assembly having extendable roof rack bows.

BACKGROUND OF THE INVENTION

Roof rack assemblies are often secured to vehicle roofs for supporting cargo above the roof. Roof rack assemblies often have longitudinally arranged roof rails. Transverse roof rack bows, sometimes referred to as cross members, may be used to span the distance between the roof rails. Roof rack bows can contribute to aerodynamic drag and wind noise, so some designs allow the bows to be removed from the roof when not in use, or to be stowed in the roof rails. On some vehicles, the distance between the roof rails is greater than the length of the roof rails, making it difficult to stow the roof bows within the roof rails when the roof rack bows are not in use. Telescoping roof rack bows can be difficult for an operator to manually extend so that they reach across the roof between the roof rails.

SUMMARY OF THE INVENTION

A roof rack assembly is provided with stowable roof bows that easily extend in length by a predetermined amount when pivoted from a stowed position to a deployed position to span the distance between the roof rails. The roof rack assembly has first and second roof rails spaced from one another, each roof rail having a respective deployable roof rack bow and a respective drive mechanism operatively connected to the roof rack bow that causes the roof rack bow to automatically extend in length by a predetermined amount when pivoted from a stowed position to a deployed position, and automatically retract in length by the predetermined amount when pivoted from the deployed position to the retracted position. The predetermined amount that the bows extend when pivoted is sufficient to cause the respective roof rack bows to span the distance between the first roof rail and the second roof rail when in the deployed position.

The drive mechanisms each include a respective biasing mechanism biasing ends of the respective roof rack bow apart from one another to bias the respective roof rack bow to the deployed position. The biasing mechanisms urge the roof rack bows to extend, but in the stowed positions, the bows are restrained by the roof rails and the drive mechanisms, and cannot extend. The drive mechanisms are powered only by manual pivoting and the force of the biasing mechanism such that they are deployed by mechanical power without requiring any electrical power. Each drive mechanism includes a gear mechanism driving a spool, and a cable fixed at one end to a distal portion of the roof rack bow and fixed at another end to the spool. The biasing mechanism causes the cable to unwind from the spool by the predetermined amount when the roof rack bow is pivoted from the stowed position to the deployed position. The cable is rewound onto the spool by the gear mechanism when the roof rack bow is pivoted from the deployed position to the stowed position. Each gear mechanism includes a fixed gear defining a pivot axis about which the respective roof rack bow pivots, and further includes a first drive gear meshing with the fixed gear, a second drive gear meshing with the first drive gear, a final drive gear meshing with the second drive gear, and a spool fixed to the final drive gear and on which the cable is wound. The first drive gear, the second drive gear and the spool rotate as the roof rack bow is pivoted, multiplying the number of turns of the first drive gear via a final drive ratio to unwind the cable the predetermined amount.

Thus, the roof rack assembly reduces aerodynamic drag and wind noise while allowing the spacing between the roof rails to be greater than a stowed length of the roof rack bows. No electrical power is required, and the extended and stowed lengths are automatically achieved simply by pivoting the roof rack bows.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic partially cross-sectional illustration of a gear mechanism within the roof rack bow of FIG. 4;

FIG. 6 is a schematic illustration of the gear mechanism of FIG. 5 viewed from above and showing the gear mechanism pivoting with the roof rack bow as the roof rack bow moves from a stowed position, shown in phantom, to a deployed position; and FIG. 7 is a schematic perspective illustration showing a distal end of one of the roof rack bows secured to the opposite roof rail in the deployed position.

DESCRIPTION OF THE PREFERRED EMBODIMENTS

Figure 1:
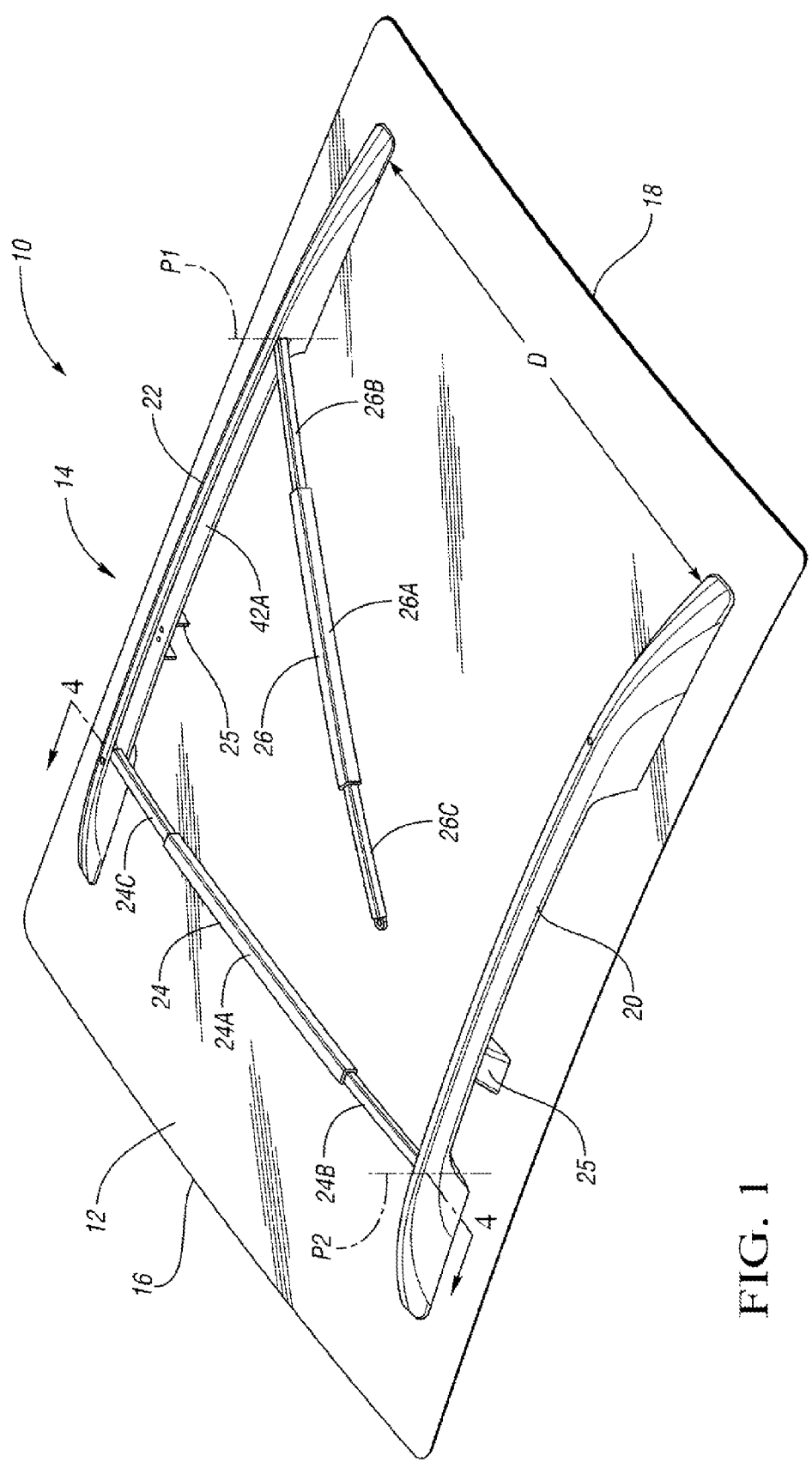
FIG. 1 is a schematic illustration in perspective view of a vehicle roof with a roof rack assembly showing one roof rack bow in a deployed position and one roof rack bow pivoting from a stowed position in a roof rail to the deployed position.

Referring to the drawings, wherein like reference numbers refer to like components, FIG. 1 shows a vehicle 10 represented by a roof 12 having a roof rack assembly 14 secured thereto. The front of the vehicle roof, i.e., that portion that is generally forward when the vehicle is driven in a forward direction is indicated as 16, while the rear of the vehicle roof is indicated as 18.

The roof rack assembly 14 includes a first elongated roof rail 20 and a second elongated roof rail 22, both extending in a generally fore/aft or longitudinal direction on the vehicle 10. The roof rails 20, 22 each arch upward slightly from the roof 12 at a midportion that is supported by a mount 25 secured to the roof 12. The roof rails 20, 22 are parallel with one another and spaced by a transverse distance D that is spanned by a first roof rack bow 24 and a second roof rack bow 26, also referred to as cross-members, when the bows 24, 26 are in a deployed position (shown in FIG. 1), also referred to as a use position. In FIG. 1, roof rack bow 24 is shown in a deployed position, ready to support cargo (not shown). Roof rack bow 26 is shown being automatically extended as it is manually pivoted from a stowed position (shown in FIG. 2) to a deployed position that will span the distance D, as shown in FIG. 3. In the stowed position, the roof rack bows 24, 26 have an overall length L to which they are limited by the roof rails 20, 22. In the deployed position, the roof rack bows 24, 26 are substantially parallel with one another and substantially perpendicular to the roof rails 20, 22. The segments 24B, 26B at which the bows 24, 26 are pivotably secured to the rails 20, 22 are also referred to herein as end portions.

Figure 4:
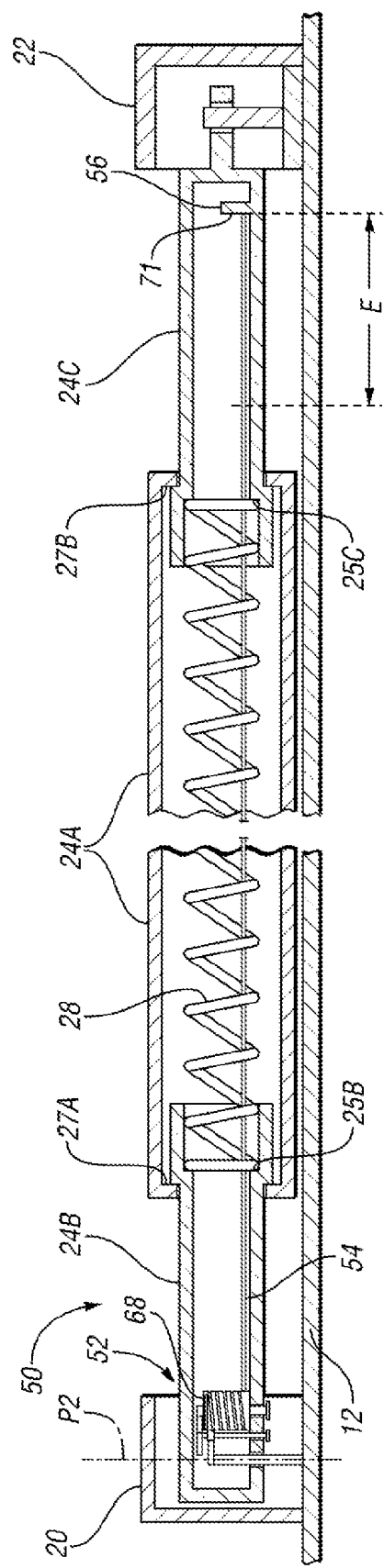
FIG. 4 is a schematic partially cross-sectional illustration of one of the roof rack bows of FIGS. 1-3 in the deployed position, taken at the arrows 4-4 in FIG. 1.

Each of the roof rack bows 24, 26 has multiple telescoping segments. Roof rack bow 24 has segments 24A, 24B, and 24C. Segments 24B and 24C are biased apart from one another by a biasing mechanism, such as a spring 28 (shown in FIG. 4) located within segment 24A. Segment 24C is also referred to as the distal portion of the roof rack bow 24, and is biased away from the segment 24B that is operatively connected to the roof rail 20 and that pivots about axis P2, as further explained in FIG. 4. As shown in FIG. 4, the segments 24B and 24C have shoulders 25B and 25C that limit extension of the spring 28. The segment 24A has stops 27A, 27B that limit extension of the segments 24B, 24C out of segment 24A causing the bow 24 to have a maximum length D. Referring to FIG. 1, roof rack bow 26 also has multiple telescoping segments 26A, 26B, and 26C. Segments 26B and 26C are biased apart from one another by a spring located within segment 26A. The spring located within segment 26A, is not shown in the drawings, but is identical to spring 28 located within segment 24A. Segment 26C is also referred to as the distal portion of the roof rack bow 26, and is biased away from the segment 26B that is operatively connected to the roof rail 22 and that pivots about pivot axis P1. The segments 26A, 26B, 26C are configured identically to segments 24A, 24B and 24C.

Figure 2:
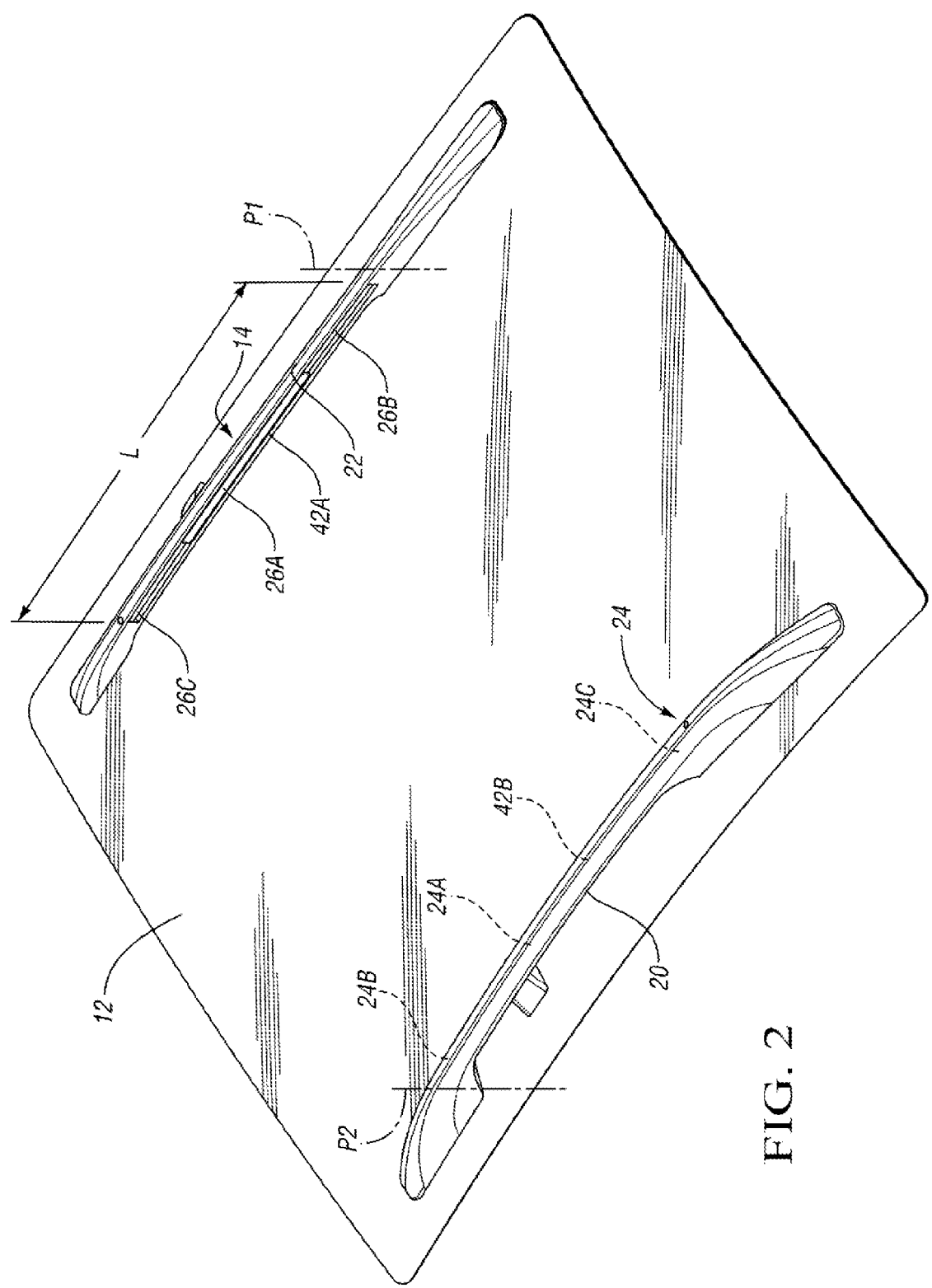
FIG. 2 is a schematic illustration in perspective view of the roof rack assembly of FIG. 1 showing both roof rack bows in a stowed position within vehicle roof rails.
Figure 3:
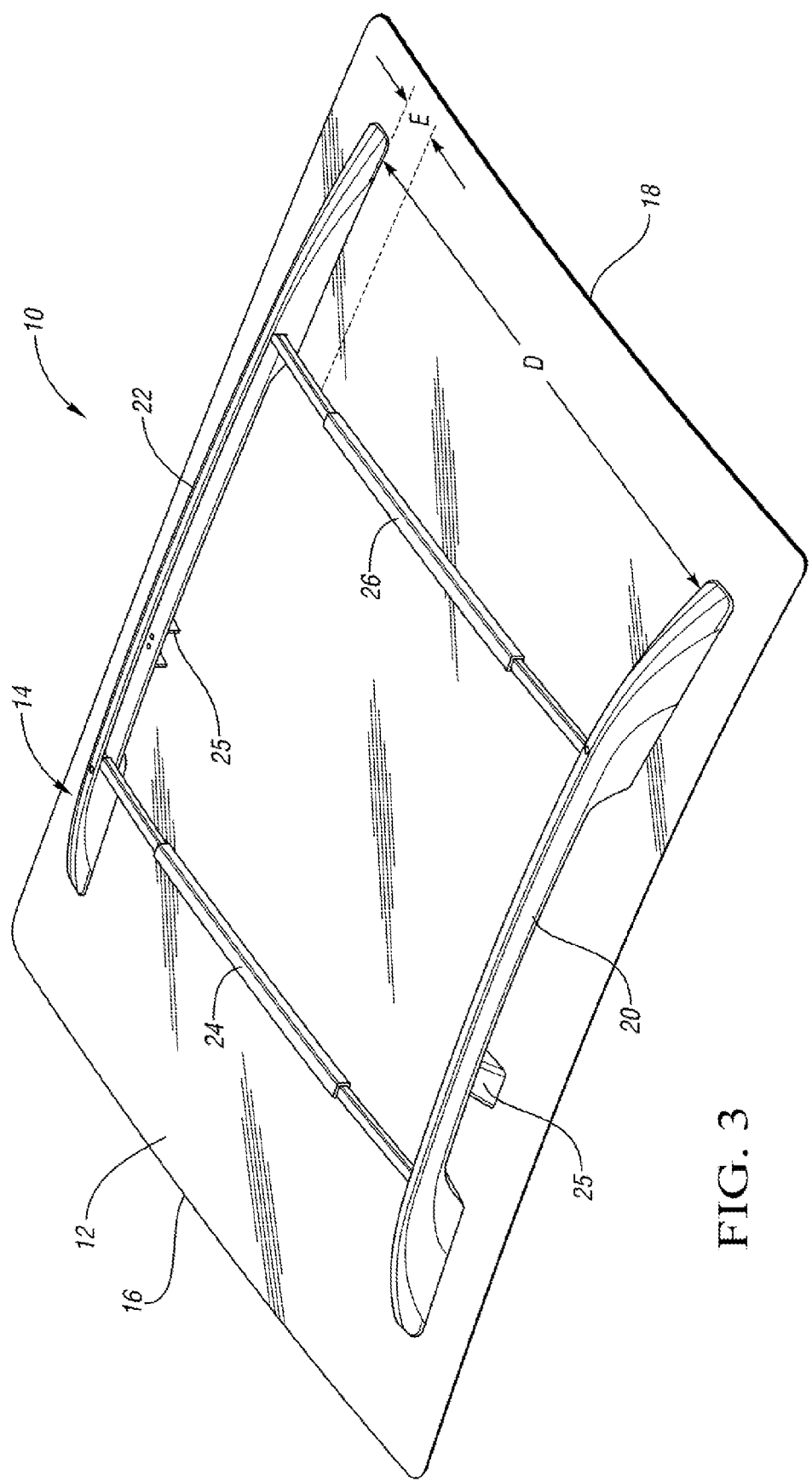
FIG. 3 is a schematic illustration in perspective view of the roof rack assembly of FIG. 1 showing both roof rack bows in a deployed position.

Referring to FIG. 2, roof rack bows 24, 26 are pivoted about respective pivot axes P1, P2 to stowed positions in which the roof rack bows 24, 26 are nested within respective cavities 42A, 42B formed in the roof rails 20, 22 (cavity 42B best shown in FIG. 7). (Cavity 42A is a mirror image of cavity 42B, and thus need not be shown in greater detail than in FIG. 2 in order for one of ordinary skill in the art to understand roof rack assembly 14.) In the stowed positions, the roof rack bows 24, 26 are collapsed to a length L to fit within the cavities 42A, 42B of the roof rails 20, 22. Thus, the roof rack bows 24, 26 pivot about respective pivot axes P1, P2 at respective segments 24B, 26B that are diagonally opposite one another.

Referring to FIG. 3, when the roof rack bows 24, 26 are in the extended or deployed positions, they extend a predetermined amount E (also referred to as a predetermined length) from the stowed lengths L (see FIG. 2) to span the distance D. The extension by the amount E is controlled by a respective non-electrically powered (i.e., mechanically powered) drive mechanism integrated within each of the bows 24, 26. Referring to FIG. 4, a first non-electrically powered drive mechanism 50 is integrated in the roof rack bow 24. A second identical drive mechanism is integrated in roof rack bow 26. The nonpowered drive mechanism 50 includes a biasing mechanism, such as spring 28, a gear mechanism 52 nested within the segment 24B, and an elongated member, such as a cable 54, extending from the gear mechanism 52 by an amount related to the amount of pivoting of the roof rack bow 24 about axis P2. The elongated member may instead be a wire, a chain, a rope, etc. The cable 54 is shown extending through the center of the spring 28. The gear mechanism 52 is referred to herein as a first gear mechanism, while the identical gear mechanism in roof rack bow 26 is a second gear mechanism. Instead of gears, sprockets could be used.

The cable 54 winds and unwinds from the gear mechanism 52 as the roof rack bow 24 is pivoted from the stowed position to the extended position. One end 71 of the cable 54 is fixed to a post 56 or other portion of the segment 24C. The other end 72 of the cable 54 is fixed to a spool 68 of the gear mechanism 52, as shown in greater detail in FIG. 5. A portion of the cable 54 is wrapped around the spool 68. The gear mechanism 52 is configured so that the cable 54 will unwind a predetermined amount E due to the force of the spring 28 when the roof rack bow 24 is pivoted from the stowed position to the extended position. The predetermined amount E is the difference between the distance D between the roof rails 20, 22 and the length L of the stowed roof rack bows 24, 26. When moving the bow 24 or 26 from the extended position to the stowed position, the gear mechanism 52 turns the spool 68, forcing the cable 54 to wind around the spool 68, and thereby retract the bow 24 to the stowed length L. Thus, the nonpowered drive mechanism allows the retracted bow 24 or 26 to compactly fit within the space available in the roof rail 20 or 22, and yet still extend to traverse the distance D between the roof rails 20, 22.

Referring to FIG. 5, the gear mechanism 52 has a gear train that includes a fixed gear 58 connected to the roof 12 or the roof rail 20 via gear shaft 58A fixed to first gear 58 such that the fixed gear 58 cannot pivot or rotate relative to the roof 12 or the inside of the roof rail 20. The fixed gear 58 defines the center axis P2 shown in FIG. 1 about which the roof rack bow 24 pivots. The remaining components of the gear mechanism 52 pivot with the roof bow 24 about pivot axis P2 when the roof bow 24 is pivoted. A first drive gear 60 meshes with the fixed gear 58. The first drive gear 60 is positioned within the roof bow segment 24B such that the first drive gear 60 pivots with the roof bow segment 24B when the roof bow 24 is pivoted between the stowed and extended positions, but rotates relative to the roof bow segment 24B about axis P3. This is accomplished by fitting gear shaft 60A through a locating opening 62. Gear shaft 60A is fixed to the first drive gear 60.

A second drive gear 64 is also fixed to gear shaft 60A such that the second drive gear 64 rotates commonly with first drive gear 60 about axis P3. A final drive gear 66 is fixed for rotation with the spool 68 about an axis of rotation P4. The final drive gear 66 meshes with the second drive gear 64. The spool 68 has a track or threads 70 in which the cable 54 is wound from a cable end 72 fixed to the spool 68. The threads 70 ensure that the length of the cable 54 wound around the spool 68 is controlled when the spool 68 is rotated. The spool 68 is also fitted in locating opening 74 in the roof bow segment 24B such that the spool 68 is rotatable relative to the segment 24B.

The gear mechanism 52 is configured to provide a final drive ratio that results in the spool 68 rotating a required number of turns to allow the predetermined length E of cable 54 to unwrap from the threads 70 so that the roof rack bow 24 will extend the predetermined amount E when the roof rack bow 24B is pivoted from the stowed position (shown in phantom at 24BB in FIG. 6) to the deployed position of FIG. 6, and to wrap the predetermined length E back onto the spool 68 when the roof rack bow 24 is pivoted from the extended position to the stowed position. The final drive ratio of the gear mechanism 52 is a function of the ratio of the diameters of the gears 58, 60, 64, 66. In this embodiment, referring to FIG. 6, the fixed gear 58 is shown as a quarter gear, as the first drive gear 60 rotates only about a ninety-degree portion of the gear 58. The first drive gear 60 has an effective diameter D1 that is one fifth the effective diameter DF of the fixed gear 58. As used herein, "effective diameter" is twice the distance from the center of a gear to the points of contact of the gear teeth meshing with the teeth of an adjacent gear. The second drive gear 64 has an effective diameter D2 that is the same as the effective diameter DF of the fixed gear 58. The final drive gear 66 has an effective diameter D3 that is the same as the effective diameter D1 of the first drive gear 60. These gear sizes result in a final drive ratio of 25:1, such that the spool 68 rotates twenty-five times the number of rotations of first drive gear 60 as the bow 24 is pivoted about axis P2.

The travel distance E of the bow 24 between the stowed length L and the deployed length D is the length of cable that must be wound and unwound from the spool 68 as the bow 24 is pivoted between the stowed and deployed positions. The effective diameter of the spool DS is related to the travel required and the final drive ratio of the gear mechanism 52 according to the following formula:

$$\text{effective diameter of spool} = (\text{final drive ratio}) * (\text{angle of pivoting of the bow}) * (\text{amount of travel of cable}) / \pi$$

Because the roof rack bow 24 pivots 90 degrees and the final drive ratio is 25:1, and assuming the required travel E of the cable is 400 mm, the required effective spool diameter DS is 20.37 mm. A spool 68 with this diameter would complete 6.25 rotations as the bow 24 pivots from the stowed position to the deployed position. Assuming a cable diameter of 1 mm, if the cable 54 was wound tightly around the spool 68 so that the loops of cable were touching, the spool 68 would be 6.25 mm tall plus the height of the spool walls and ends. If the smaller diameter gears (first drive gear 60 and final drive gear 66) each have an effective diameter of 6 mm, then the larger diameter gears (second drive gear 64 and fixed gear 58) would each have an effective diameter of 30 mm. These dimensions are exemplary only; dimensions may be selected according to the desired components sizes and available packaging space.

Referring to FIG. 4, the spring 28 urges the cable 54 to unwind as the bow 24 is pivoted. The gear mechanism 52 works against the force of the spring 28 when winding the cable 54 around the spool 68 when the bow 24 pivots from the deployed position to the stowed position.

Referring to FIG. 7, the distal end portion of segment 26C is shown having a connecting end 80 with an opening through which a depressible pin 82 in the rail 20 is used to lock the bow 26 in the deployed position. A similar connecting end and depressible pin are used to lock the segment 24C of roof rack bow 24 to the roof rail 22. The pins 82 are pressed to release the bows 24, 26 to allow the bows 24, 26 to be pivoted back to the stowed positions. Other means of connecting the bow segments 24C, 26C to the rails 20, 22 may also be used. The cavities 42A, 42B may be vertically offset from one another so that the bows 24, 26 can cross over and past one another when being pivoted between the stowed and deployed positions.

While the best modes for carrying out the invention have been described in detail, those familiar with the art to which this invention relates will recognize various alternative designs and embodiments for practicing the invention within the scope of the appended claims.

The invention claimed is:

1. A roof rack assembly comprising:
   first and second roof rails spaced from one another;
   first and second deployable roof rack bows;
   first and second drive mechanisms operatively connected to the respective first and second roof rack bows and configured to cause the respective roof rack bows to automatically extend in length by a predetermined amount when pivoted from a stowed position to a deployed position and retract in length by the predetermined amount when pivoted from the deployed position to the retracted position, the predetermined amount being sufficient to cause the respective roof rack bows to span from the first roof rail to the second roof rail when in the deployed position; and wherein the first and the second roof rack bows are substantially parallel with the first and the second roof rails when in the stowed position.

2. The roof rack assembly of claim 1, wherein the drive mechanisms each include a respective biasing mechanism biasing ends of the respective roof rack bow apart from one another to bias the respective roof rack bow to the deployed position.

3. The roof rack assembly of claim 2, wherein the drive mechanisms each include a gear mechanism driving a spool, and a cable fixed at one end to a distal portion of the respective roof rack bow and fixed at another end to the spool; wherein the cable is unwound from the spool when the respective roof rack bow is pivoted from the stowed position to the deployed position due to the respective biasing mechanism; and wherein the cable is rewound onto the spool when the respective roof rack bow is pivoted from the deployed position to the stowed position.

4. The roof rack assembly of claim 3, wherein each gear mechanism includes a fixed gear defining a pivot axis about which the respective roof rack bow pivots, and further includes a first drive gear meshing with the fixed gear, a second drive gear meshing with the first drive gear, a final drive gear meshing with the second drive gear; wherein the spool is fixed to the final drive gear; and wherein the first drive gear, the second drive gear and the spool rotate as the roof rack bow is pivoted.

5. The roof rack assembly of claim 4, wherein tooth ratios of the gears of each gear mechanism cause rotation of the respective second drive gear to be increased relative to the rotation of the respective first drive gear.

6. The roof rack assembly of claim 2, wherein the respective biasing mechanisms are springs, and wherein the roof rack bows have telescoping segments biased away from one another by the respective springs.

7. The roof rack assembly of claim 6, wherein the respective springs are internal to the respective telescoping segments; and wherein the telescoping segments include internal stops to limit extension of the respective springs.

8. A roof rack assembly for a vehicle comprising:
   a first and a second roof rail spaced a predetermined distance from one another;
   a first roof rack bow;
   a first gear mechanism operatively connecting a first portion of the first roof rack bow to the first roof rail such that the first roof rack bow is pivotable between a stowed position and an extended position;
   a first cable extending from the first gear mechanism to a second portion of the first roof rack bow;
   a biasing mechanism biasing the first portion of the first roof rack bow away from the second portion of the first roof rack bow;
   wherein the biasing mechanism urges the cable to unwind from the first gear mechanism by a predetermined length to cause the first roof rack bow to extend by the predetermined length to span the predetermined distance when the first roof rack bow is pivoted away from the first roof rail to the extended position; and wherein the first gear mechanism winds the predetermined length of the cable to retract the roof rack bow by the predetermined length when the first roof rack bow is pivoted toward the first roof rail to the stowed position.

9. The roof rack assembly of claim 8, wherein the biasing mechanism is a spring; and wherein the first roof rack bow is a telescoping roof rack bow with different segments biased away from one another by the spring.

10. The roof rack assembly of claim 9, wherein the spring is internal to the first roof rack bow, and at least one of the different segments includes internal stops to limit extension of the spring.

11. The roof rack assembly of claim 8, wherein the first gear mechanism includes a fixed gear defining a pivot axis about which the first roof rack bow pivots, and further includes a first drive gear meshing with the fixed gear, a second drive gear meshing with the first drive gear, a final drive gear meshing with the second drive gear, and a spool fixed to the final drive gear and on which the cable is wound, wherein the first drive gear, the second drive gear and the spool rotate as the roof rack bow is pivoted.

12. The roof rack assembly of claim 11, wherein gear tooth ratios of the first gear mechanism cause rotation of the second drive gear to be increased relative to the rotation of the first drive gear.

13. The roof rack assembly of claim 11, wherein the first drive gear and the final drive gear have effective diameters less than an effective diameter of the fixed gear; and wherein the second drive gear has an effective diameter approximately the same as the effective diameter of the fixed gear.

14. A roof rack assembly for a vehicle roof comprising:
a pair of elongated roof rails spaced a distance from one another and configured to extend generally fore and aft on the vehicle roof;
a pair of telescoping roof rack bows each having opposing end portions; wherein each of the roof rack bows is pivotably secured with respect to a different one of the roof rails at a respective one of the end portions diagonally opposite the other of the roof rack bows and is pivotable between a stowed position to avoid aerodynamic drag and a deployed position to support cargo; wherein the roof rack bows are configured to be nested within the roof rails in the stowed position, and substantially perpendicular to the roof rails and parallel with one another in the deployed position; and
a drive mechanism configured to cause the roof rack bows to extend in length by a predetermined amount when pivoted from the stowed position to the deployed position and to retract in length by the predetermined amount when pivoted from the deployed position to the stowed position, the predetermined amount being sufficient to cause the roof rack bows to span the distance between the roof rails when in the deployed position.

15. The roof rack assembly of claim 14, wherein the drive mechanisms each include a respective biasing mechanism biasing ends of the respective roof rack bow apart from one another to bias the respective roof rack bow to the deployed position.

16. The roof rack assembly of claim 15, wherein the drive mechanisms each include a gear mechanism driving a spool, and a cable fixed at one end to a distal portion of the respective roof rack bow and fixed at another end to the spool; wherein the cable is unwound from the spool when the respective roof rack bow is pivoted from the stowed position to the deployed position due to the respective biasing mechanism; and wherein the cable is rewound onto the spool when the respective roof rack bow is pivoted from the deployed position to the stowed position.

17. The roof rack assembly of claim 16, wherein each gear mechanism includes a fixed gear defining a pivot axis about which the respective roof rack bow pivots, and further includes a first drive gear meshing with the fixed gear, a second drive gear meshing with the first drive gear, a final drive gear meshing with the second drive gear; wherein the spool is fixed to the final drive gear; and wherein the first drive gear, the second drive gear and the spool rotate as the roof rack bow is pivoted.

18. The roof rack assembly of claim 17, wherein tooth ratios of the gears of each gear mechanism cause rotation of the respective second drive gear to be increased relative to the rotation of the respective first drive gear.

19. The roof rack assembly of claim 15, wherein the respective biasing mechanisms are springs, and wherein the roof rack bows have telescoping segments biased away from one another by the respective springs.

20. The roof rack assembly of claim 19, wherein the respective springs are internal to the respective telescoping segments; and wherein the telescoping segments include internal stops to limit extension of the respective springs.

* * * * *